(12) United States Patent
Smith

(10) Patent No.: US 6,862,640 B2
(45) Date of Patent: Mar. 1, 2005

(54) ARBITRATION IN LOCAL SYSTEM FOR ACCESS TO MEMORY IN A DISTANT SUBSYSTEM

(75) Inventor: Patrick J. Smith, Houston, TX (US)

(73) Assignee: Texas Instruments Incorporated, Dallas, TX (US)

(*) Notice: Subject to any disclaimer, the term of this patent is extended or adjusted under 35 U.S.C. 154(b) by 444 days.

(21) Appl. No.: 10/077,228

(22) Filed: Feb. 15, 2002

(65) Prior Publication Data

US 2003/0018859 A1 Jan. 23, 2003

Related U.S. Application Data

(60) Provisional application No. 60/282,886, filed on Apr. 10, 2001.

(51) Int. Cl.$^7$ .......................... G06F 12/00; G06F 13/14
(52) U.S. Cl. .................. 710/240; 710/309; 710/43; 711/149
(58) Field of Search .................. 710/43, 113–115, 710/118, 119, 121, 122, 124, 125, 305, 309, 311, 244, 240–242; 711/147, 149, 150, 151

(56) References Cited

U.S. PATENT DOCUMENTS

| 5,214,775 A | | 5/1993 | Yabushita et al. | |
|---|---|---|---|---|
| 5,375,089 A | * | 12/1994 | Lo ........................ | 365/189.04 |
| 5,669,009 A | * | 9/1997 | Buktenica et al. ............ | 712/35 |
| 5,761,455 A | * | 6/1998 | King et al. .................. | 710/316 |
| 5,859,975 A | | 1/1999 | Brewer et al. | |
| 5,956,286 A | * | 9/1999 | Lattimore et al. ...... | 365/230.05 |
| 5,960,458 A | * | 9/1999 | Kametani .................... | 711/147 |
| 6,480,927 B1 | * | 11/2002 | Bauman ..................... | 710/317 |
| 6,487,643 B1 | * | 11/2002 | Khare et al. ................ | 711/150 |
| 6,513,089 B1 | * | 1/2003 | Hofmann et al. ........... | 710/309 |
| 6,532,524 B1 | * | 3/2003 | Fan et al. ................... | 711/168 |
| 6,545,935 B1 | * | 4/2003 | Hsu et al. .............. | 365/230.05 |
| 6,604,174 B1 | * | 8/2003 | Dean et al. ................. | 711/131 |
| 6,625,686 B2 | * | 9/2003 | Hasegawa et al. .......... | 711/104 |
| 6,691,216 B2 | | 2/2004 | Kelly et al. | |

* cited by examiner

Primary Examiner—Sumati Lefkowitz
Assistant Examiner—Trisha Vu
(74) Attorney, Agent, or Firm—Robert D. Marshall, Jr.; W. James Brady, III; Frederick J. Telecky, Jr.

(57) ABSTRACT

A multiprocessor system includes a plurality of data processors. Each data processor includes: a data processing core; a memory forming a local portion of a unified memory; and a global memory arbitration logic. Each local portion of the unified memory is dual ported. The global memory arbitration logic arbitrates access to a first port among the corresponding data processing core and a close data processing core. The global memory arbitration logic arbitrates access to a second port of another data processor among data processing cores having a far connection to that local portion of unified memory. The dual port memory is preferably time multiplexed. The global memory arbitration logic grants a local peripheral bus priority access to both ports of the local portion of unified memory.

6 Claims, 3 Drawing Sheets

ARBITRATION IN LOCAL SYSTEM FOR ACCESS TO MEMORY IN A DISTANT SUBSYSTEM

This application claims priority under 35 USC §119(e)(1) of Provisional Application No. 60/282,886, filed Apr. 10, 2001.

TECHNICAL FIELD OF THE INVENTION

The technical field of this invention is data movement in multiprocessor systems.

BACKGROUND OF THE INVENTION

Microprocessor systems employing multiple processor subsystems including a combination of local and shared memory are becoming increasingly common. Such systems normally have interconnect formed in large part by wide busses carrying data and control information from one subsystem to another.

Busses are at one instant of time controlled by a specific module that is sending information to other modules. A classical challenge in such designs is providing bus arbitration that guarantees that there are no unresolved collisions between separate modules striving for control of the bus.

SUMMARY OF THE INVENTION

The preferred embodiment of this invention relates to bus arbitration in a Multiple-DSP Shared-Memory (MDSM) systems. The preferred embodiment MDSM contains four fixed point DSP cores and a total of 896 K Words of on-chip single-access RAM (SARAM) and dual-access RAM (DARAM). It is highly optimized for remote access server (RAS) or remote access concentrator (RAC) and other DSP applications.

This invention comprises an arbitration technique for bus access in a multiple DSP system having four-way shared DARAM memory modules. A DARAM4W Wrapper envelops and includes the shared DRAM memory. It includes all the necessary arbitration and data steering logic to resolve simultaneous access requests by four program "read" ports, the local peripheral port and the local program "write" port.

In each DARAM up to two accesses can occur every clock cycle, one on each one-half clock period. The ports are hardwired to a particular one-half cycle for simplicity of operation. This maintains a one wait state requirement for the design under normal operating conditions. Arbitration among the four local DARAM selects, peripheral bus (M bus) writes and program writes is performed in the DARAM4W Wrapper. A global traffic module decodes, in straightforward fashion, all input program page addresses and generates the four local DARAM selects. Arbitration between the two simultaneous program page accesses to the neighbor DARAM is performed within the global traffic module.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
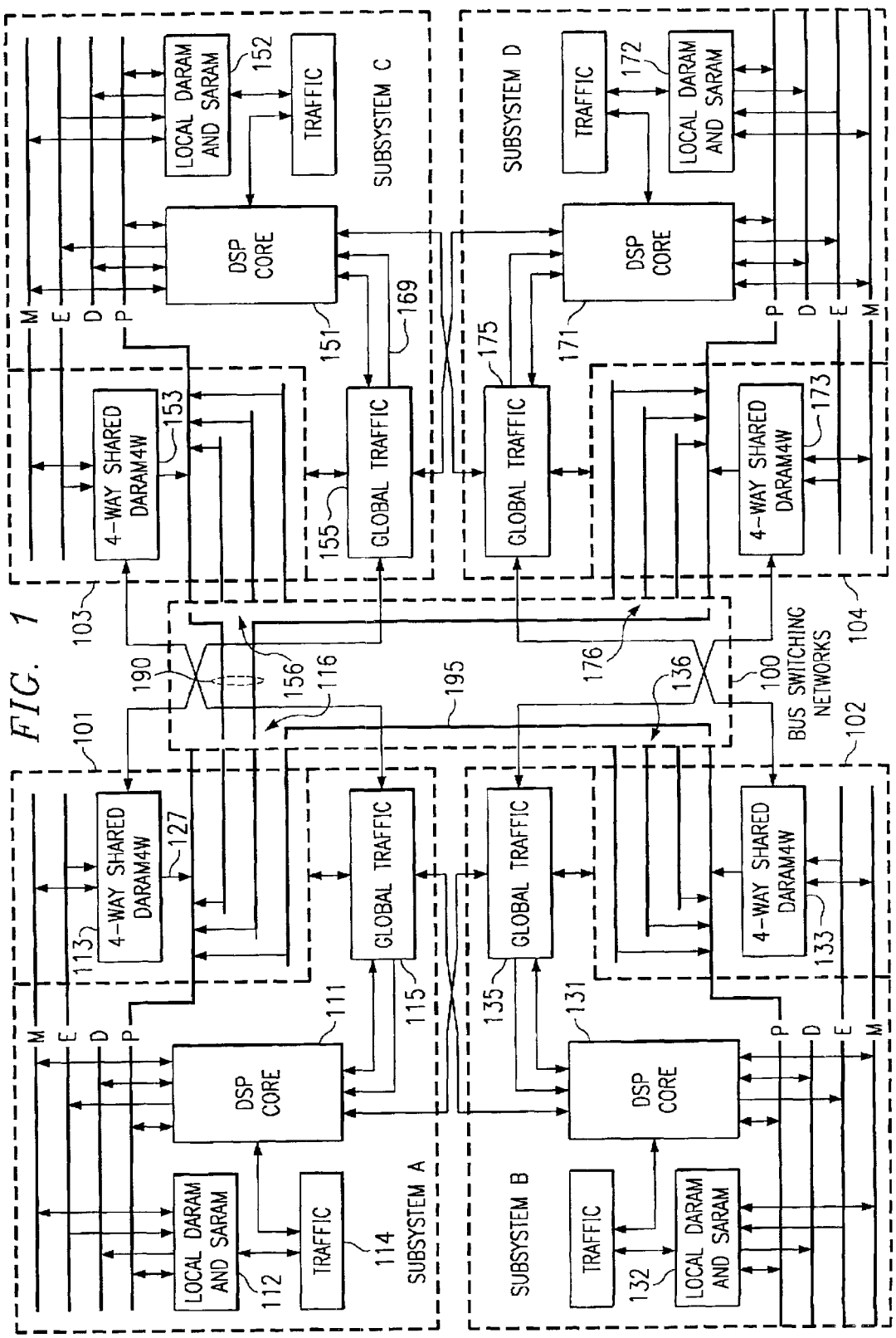
FIG. 1 illustrates in high level block diagram form a multiple DSP, shared memory (MDSM) system.

The present invention relates to bus arbitration in a Multiple-DSP Shared-Memory (MDSM) system. The MDSM system of the preferred embodiment contains four fixed point DSP cores and a total of 896 K Words of single-access RAM (SARAM) and dual-access RAM (DARAM). A high-level block diagram of this MDSM system is illustrated in FIG. 1. The four subsystems A 101, B 102, C 103 and D 104, are each connected to the other subsystems via four read busses entering the bus switching networks 100 at locations 116, 136, 156 and 176.

DSP core 111 of subsystem A 101 accesses shared memory 153 in subsystem C 103 by way of its global traffic module 115. DSP core 111 also accesses shared memory 133 in subsystem B 102 and shared memory 173 in subsystem D, both by way of global traffic module 135 of subsystem B 102. The subsystems C 103 and D 104 are "far" subsystems to subsystem A 101. This means that propagation delays are longer for such accesses than for "close" accesses. Each DSP core such as DSP core 111 includes data manipulation, data access and program flow control hardware. The data manipulation hardware typically includes: an integer arithmetic logic unit (ALU); a multiplier, which may be part of a multiply-accumulate (MAC) unit; a register file including plural data registers; and may include special purpose accelerator hardware configured for particular uses. The data access hardware typically includes: a load unit controlling data transfer from memory to a data register within the register file; and a store unit controlling data transfer from a data register to memory. Control of data transfer by a load unit and a store unit typically employs address registers storing the corresponding memory addresses as well as address manipulation hardware such as for addition of the contents of an address register and an index register or immediate field. DSP core 111 may include plural units of each type and operate according to superscalar or very long instruction word (VLIW) principles known in the art. The program flow control hardware typically includes: a program counter storing the memory address of the current instruction or instructions; conditional, unconditional and calculated branch logic; subroutine control logic; interrupt control logic; and may also include: instruction prefetch logic; and branch prediction logic. The exact structure of DSP core 111 is not as important as that it functions as a computer central processing unit.

Paths 190 leading from subsystem C 103 shared memory 152 and subsystem D 104 shared memory 173 to DSP core 111 illustrates symbolically such a "far" path. Subsystem B is a "close" subsystem to subsystem A 101. This means that propagation delays are shorter for such accesses than for "far" accesses. Path 195 leading from subsystem B 102 shared memory 133 to DSP core 111 illustrates symbolically such a "close" path.

Each subsystem has a corresponding set of "close" and "far" access paths for its own DSP. The "program read" cycle in which such "read" accesses will be performed are selected for the "close" and "far" accesses. Four "program read" accesses are defined. PROGRAM READ 1 and PROGRAM READ 2 are initiated at the beginning of the first half of clock cycle; PROGRAM READ 3 and PROGRAM READ 4 are initiated at the beginning of the last half of clock cycle. Table 1 lists, for each subsystem and DSP, the local, close and far path accesses illustrated in FIG. 1.

TABLE 1

| Subsystem/DSP | Local | Close Paths/Cycle | Far Paths/Cycle |
|---|---|---|---|
| Subs A/111 | 112 | 195 A, B READ 3, 4 | 190 C, D READ 1, 2 |
| Subs B/131 | 132 | A, B READ 3, 4 | C, D READ 1, 2 |
| Subs C/151 | 152 | C, D READ 3, 4 | A, B READ 1, 2 |
| Subs D/171 | 172 | C, D READ 3, 4 | A, B READ 1, 2 |

The MDSM system paths, by which the four-way shared dual access RAM data flows, are directed by way of the global traffic modules (global traffic module 115 in subsystem A 101). Each global traffic module drives a four-way shared DARAM wrapper (DARAM4W 127 in subsystem A 101) that contains the arbitration logic necessary to avoid bus collisions.

Figure 2:
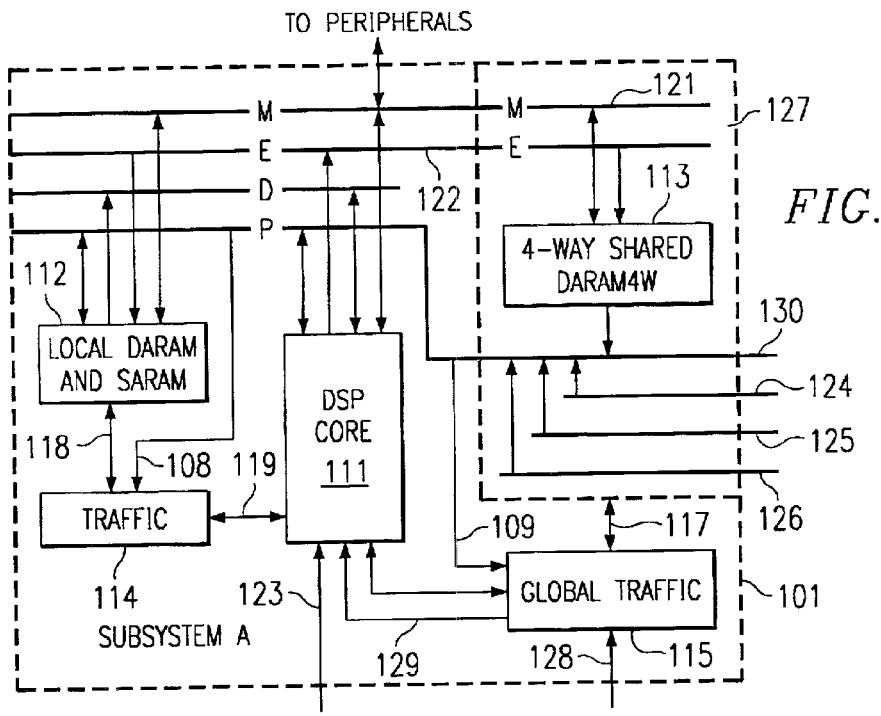
FIG. 2 illustrates the individual functional blocks of one subsystem of an MDSM system.

FIG. 2 illustrates in block diagram form individual functional blocks comprising subsystem A 101. Subsystems B 102, C 103 and D 104 are identical to subsystem A 104. DSP core 111 has "read" access within subsystem A 101 to unshared local RAM 112 via bus program (P) bus 130 and shared RAM 113 also via P bus 130. DSP core 111 has "write" access within subsystem A 101 to unshared local RAM 112 and shared RAM 113 via E bus 122. By way of three additional busses 124, 125, and 126, DSP core 111 also has read access to shared RAM outside subsystem A 101 in the other three subsystems B 102, C 103 and D 104. Summarizing, four of the six paths from subsystem A 101 shared memory which must be arbitrated by the DARAM4W wrapper 113 are: "read" path 130 from shared memory 113 of subsystem A 101 to a DSP core of another of the three subsystems; "read" path 124 from shared memory 133 of subsystem B to DSP core 111 of subsystem A; "read" path 125 from shared memory 153 of subsystem C to DSP core 111 of subsystem A; and "read" path 126 from shared memory 173 of subsystem D to DSP core 111 of subsystem A.

RAM functions for the entire MDSM system are categorized as local memory, four-way shared memory and described as follows. The local memory preferably includes: 512 KW of zero wait state data SARAM, 128 KW per subsystem such as local DARAM and SARAM 112 illustrated in FIG. 2; and 128 KW zero wait state data/program DARAM, 32 KW per subsystem such as local DARAM and SARAM 112 illustrated in FIG. 2. The four-way shared memory preferably includes: 256 KW one wait state program DARAM shared by subsystems A 101, B 102, C 103 and D 104, 64 KW per subsystem such as four-way shared DARAM4W 113 illustrated in FIG. 2.

Referring to FIG. 2, the traffic module 114 decodes address 108 of DSP P bus 130 and generates control signals 118 that make the memory bank selection between the local memory blocks of local DARAM and SARAM 112. Traffic module 114 also multiplexes the received acknowledge signals and "read" data from the memory blocks to DSP core 111 via lines 119.

The global traffic module 115 decodes the address 109 of DSP P bus 130. Global traffic module 115 drives memory bank selects 117 to the four-way shared memory wrapper 127 and decodes two program address busses 109 to determine if an access is to the local block of global memory or to global memory associated with another subsystem. Because FIG. 2 is describing a particular subsystem (in this case subsystem A 101), there is an additional task its global traffic module 115 must perform. Global traffic module 115 arbitrates access by signals 128 of the other subsystems to a third subsystem for four-way shared program "read". Finally, it also communicates a global acknowledge signal 129 as part of its communication with DSP core 111.

Each MDSM subsystem contains a DARAM wrapper. DARAM4W 113 includes wrapper 127 illustrated in FIG. 2. Each DSP core is capable of accessing a 128 K word block of four-way shared memory with one wait state. Wrapper 127 interfaces local, close and far accesses to the shared portion of DARAM4W 113, that is the shared 32 K Word block of memory. DARAM4W wrapper 127 supports a total of six interfaces: Program READ bus A 130 for DSP access; Program READ bus B 124 for DSP access; Program READ bus C 125 for DSP access; Program READ bus D 126 for DSP access; M read/write bus 121 for peripheral access; and E data write bus 122 for DSP access. The basic function of wrapper 127 is to arbitrate access to the memory among these six interfaces. This involves arbitration for program "reads" among four cores, local peripheral and local program writes contending for two accesses, one on each one-half clock cycle.

Global traffic module 115 decodes the program page address for access to either its local DARAM or a neighbor DARAM. It generates a total of eight memory bank select signals of which four are local. Arbitration between the four local DARAM selects, M bus 121 writes and program writes is performed in wrapper 127. Global traffic module 115 does a straight forward decode for both input program page addresses, and generates four local DARAM selects. Arbitration between the two conflicting program page accesses to the neighbor DARAM is also performed within the global traffic module 115.

Referring again to FIG. 1, one can see that the route delay on the acknowledge "ack" signal to subsystem C 103 or subsystem D 104 for access to memory in subsystem A 101 would be unnecessarily long if it was generated from wrapper 127 in subsystem A 101. Instead, the "ack" signal 169 can be generated by the global traffic module 155 in subsystem C 103. Global traffic module 155 is physically closer to both subsystems C 103 and D 103 minimizing the route delay on the "ack" signal.

Program access to the "far" neighbor DARAM occurs in the first half of the cycle as these accesses provide a full cycle of setup time on the address. For subsystem A 101 the "far" neighbor DARAMs are those of subsystem C 103 and subsystem D 104. The requesting core is physically furthest from the target DARAM, so a full cycle address set up is required.

The local M bus 121 "read" port also competes for first half access. Local M bus 121 "reads" always have priority and are never stalled. Both page accesses to the neighbor DARAM are arbitrated every time both cores make a request simultaneously assuming there are no local M bus 121 requests.

Arbitration of conflicts between the two program page accesses to the neighbor DARAM4W 113 is performed within the global traffic module 115. The priority amongst PAGE 1 and PAGE 2 changes every time PAGE 1 and PAGE 2 both request access to the memory on the same cycle. Initially PAGE 1 will have priority over PAGE 2. A single register bit controls the priority. If a request from both PAGE 1 and PAGE 2 occurs simultaneously, priority is given to PAGE 1. The PAGE 1 bus request will complete, and the PAGE 2 bus request will be stalled one clock cycle. The priority register will toggle, so at the next occurrence of a simultaneous request by PAGE 1 and PAGE 2, PAGE 2 will be given top priority. The priority changes only when there is a collision between PAGE 1 and PAGE 2.

Wrapper 127 arbitrates access by the four program "read" ports, the local peripheral port and the local program "write" port. Up to two accesses to the memory can occur every clock cycle. An access is granted on each one-half clock cycle. The ports are hardwired to a particular one-half cycle in order to simplify operation. Table 2 lists the accesses to be made on each half-clock cycle, and identifies the arbitration priority and requirements. The paths for these program "reads", Program READ 1, Program READ 2, Program READ 3, and Program READ 4 were indicated in Table 1 for the reference numbered paths in FIG. 1.

TABLE 2

| First Half Cycle | Second Half Cycle |
| --- | --- |
| M Bus READ | M Bus Write |
| Program READ 1, READ 2 toggle | Program Write |
| | Program READ 3, READ 4 toggle |

Within a one-half cycle time interval only one of the possible requesters is granted access to the memory. The remaining requesters are stalled for one clock by driving a bus acknowledge signal low.

Program reads 1 and 2 contend for the first half of the cycle, while program READS 3 and 4 contend for the second half of the cycle. The address set-up time for the first half access is a full clock period, while the address set up time for the second half is only a half clock period. Table 3 lists the connection paths of the physical memory to the program busses for each of the four subsystems.

TABLE 3

| Subsystem | Physical Memory | READ 1 | READ 2 | READ 3 | READ 4 |
| --- | --- | --- | --- | --- | --- |
| Subs A | 4MP0/4MP1 | Prog C | Prog D | Prog A | Prog B |
| Subs B | 4MP2/4MP3 | Prog C | Prog D | Prog A | Prog B |
| Subs C | 4MP4/4MP5 | Prog A | Prog B | Prog C | Prog D |
| Subs D | 4MP6/4MP7 | Prog A | Prog B | Prog C | Prog D |

The M bus 121 read is always given top priority in the first half cycle. These signals will be serviced immediately and are never stalled. Program "reads" for bus A and B contend for the first half of the cycle, while program "reads" for bus C and D contend for the second half of the cycle. Bus 1 and bus 2 compete for the memory in the first half cycle. Each DARAM4W is wired such that bus 1 and bus 2 are driven from the other half of the chip. That is, DARAM4W 113 in subsystem A has bus 1 connected to Program C and bus 2 connected to Program D. This is done to provide the most distant cores adequate setup time.

The priority between READ 1 and READ 2 toggles every time READ 1 and READ 2 both request access to the memory on the same cycle. This has been previously described. The priority only changes when there is a collision between READ 1 and READ 2. The arbitration logic for the READ 1 and READ 2 busses is contained in the global traffic module of the other half subsystem. The arbitration for access to the four-way DARAM 113 of subsystem A 101 (4MP0/4MP1) is done in the global traffic module of subsystem C 103. This global traffic module provides the acknowledges to subsystem C 103 and subsystem D 104 for access to memory in subsystem A 101.

This approach minimizes several important parameters. This approach minimizes the propagation delay of the program page address. This minimizes the propagation delay of the "ack" signal to the requesting subsystem. It minimizes the number of signals between subsystems for four-way memory.

The multiplexing of the program "read" addresses and data for M bus 121 "reads", READ 1 and READ 2 is done inside the DARAM4W, such as DARAM4W 113. The global traffic module 115 drives bank select signals only.

The M bus 121 write is always given top priority in the second half cycle. They will be serviced immediately and are never stalled. Program "writes" from the local subsystem are given next priority. Program "writes" will be stalled if an M bus 121 "write" request is asserted at the same time as a local program "write" request. READ 3 and READ 4 compete for the memory in the second half cycle. The DARAM4W are wired such that READ 3 and READ 4 are driven from the same half of the chip. That is, DARAM4W 113 in subsystem A 101, has READ 3 connected to subsystem A 101 and READ 4 connected to subsystem B 102. This is done to provide the most distant cores adequate set-up time.

The priority amongst READ 3 and READ 4 changes every time READ 3 and READ 4 both request access to the memory on the same cycle, and there are no other requesters. Initially READ 3 will have priority over Read 4. A single register bit controls the priority. If a request from both READ 3 and READ 4 occurs simultaneously, priority is given to READ 3. The READ 3 request will complete, and the READ 4 request will be stalled one clock. The priority register will toggle, so at the next occurrence of a simultaneous request by READ 3 and READ 4, READ 4 will be given top priority. The priority only changes when there is a collision between READ 3 and READ 4 and there are no other requesters for the second half cycle.

The arbitration logic for the READ 3 and READ 4 busses is contained within the DARAM4W, such as DARAM4W 113 of subsystem 101. This is done because the arbitration for second half access is slightly more involved than that of first half and the requesting cores are physically close to the target memory. The multiplexing of the addresses and data for M bus 121 writes, program writes, READ 3 and READ 4 is done inside DARAM4W 113. Global traffic module 115 drives bank select signals 117 only.

The M bus 121 is driven by a local DMA controller and a host port interface. Typically the M bus 121 will only request access to the SARAM 112 during initial program load. Under normal operating conditions, the M bus 121 will typically not access the DARAM4W 113. The program busses READ A, READ B, READ C, and READ D can be stalled for more than one wait state if there is M bus 121 activity. If there is no M bus 121 activity, then the program READ busses will be stalled for one wait state at most.

Memory accesses through the peripheral port must be in the synchronous shared access mode (SAM). In shared access mode, the dual access RAM is accessible to both the DSP core and the peripheral. In this mode the peripheral accesses presented to the dual access RAM must be synchronous with the peripheral clock (slave). Asynchronous peripheral accesses are synchronized internally by the peripheral, and in case of a conflict between DSP and the peripheral, the peripheral has access priority and DSP access is delayed one clock cycle. The DSP accesses can only occur in SAM and are always synchronous with the DSP peripheral clock (slave).

A program read access could be stalled for one half of the cycle, while the second half of the cycle is not even used. For example, suppose only program reads 1 and 2 made requests to access the memory. Program access 1 could occur in the first half of the cycle, and 2 would be stalled one clock. No access will occur during the second half of the cycle. Note reduction of complexity in the arbitration results from permitting this kind of unused memory access slot.

To minimize the number of four-way shared memory data ports on the traffic module, the "read" data from the four-way shared memory banks is driven on to a single tri-state bus. The selects generated from the respective global traffic modules are used to control tri-state buffers.

Figure 3:
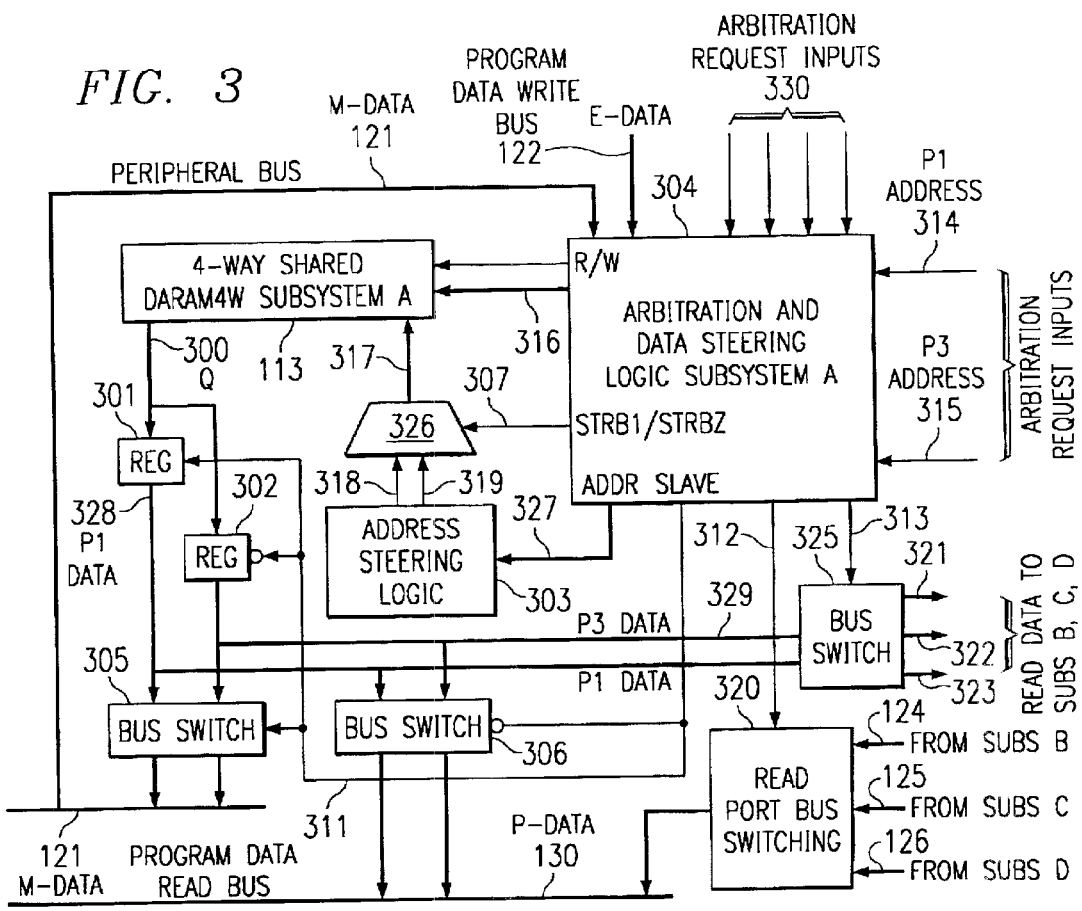
FIG. 3 illustrates in high level block diagram form the DARAM4W wrapper of representative subsystem A.

FIG. 3 illustrates conceptually the flow of data arbitrated within a subsystem. Subsystem A 101 is used as an example. Six request inputs are shown representing the six accesses which are arbitrated. Request 314 is associated with an address "P1 Address" and request 315 is associated with an address "P3 Address". Four other similar requests can be simultaneously present at arbitration request inputs 330. Arbitration and data steering logic 304 receives these inputs and separate write data inputs from M bus 121 and E bus 122. Addresses 327 are sent to address steering logic 303. Address steering logic 303 supplies two addresses to multiplexer 326. Multiplexer 326 selects one address as controlled by strobe (STRB) signal 307. The selected address input A 317 contains the required address for each half-clock cycle switched by multiplexer 326 as driven by STRB signal 307. STRB signal 307 and inverted opposite phase signal STRBZ (which are collectively labeled STRB 307) are derived in buffered form from the main DSP clock.

The DARAM 113 read port includes two full-word registers 301 and 302 which are clocked on opposite phases of SLAVE signal 311, which is a buffered form of the main DSP clock. Data Q 300 from the DARAM 113 is latched in the first phase of SLAVE signal 311 into register 301 and in the second phase of SLAVE signal 311 into and register 302. This allows P1 data 328 to arrive at the beginning of the first half of SLAVE signal 311 cycle and P3 data 329 to arrive at the beginning of the second half of SLAVE signal 311 cycle.

Blocks 305, 306, 320, and 325 provide bus switching. Blocks 305, 306, 320 and 325 are controlled from arbitration and data steering logic 304 via SLAVE signal 311, control signal 312 and control signal 313, respectively. The example block diagram of FIG. 3 could be modified in possible implementations. It is generally preferable to locate bus switching outside of the individual subsystems as illustrated in FIG. 1.

Figure 4:
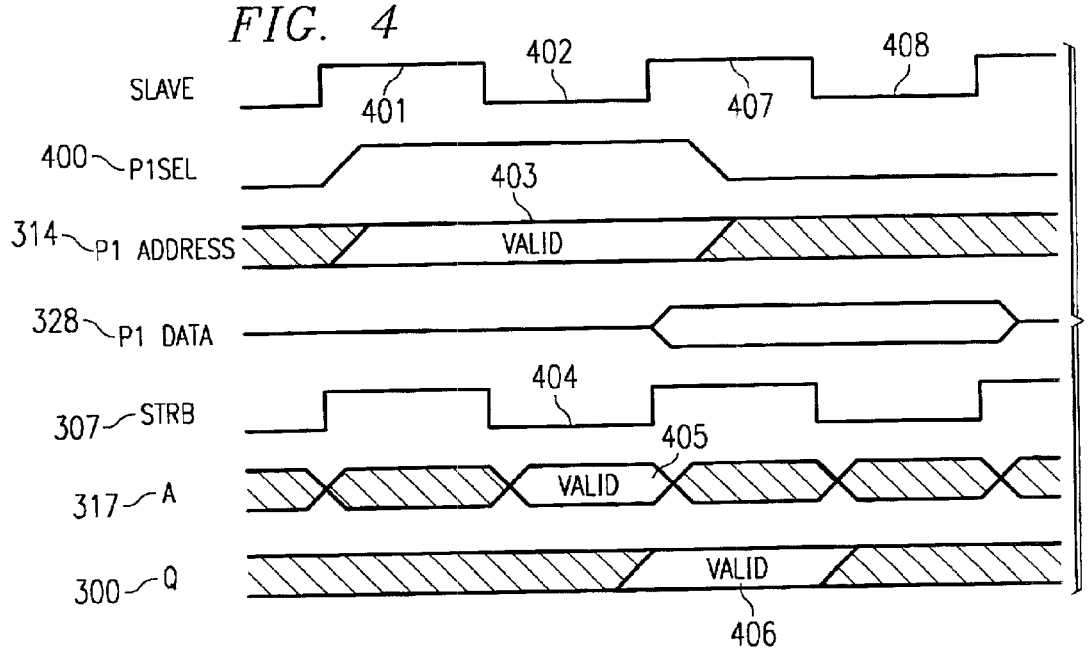
FIG. 4 illustrates the address set-up time for the first half access, a full clock period.

FIG. 4 illustrates the RAM access timing for first-half arbitration that occurs between the two furthest subsystems. Subsystem A 101 is once again used as an example. In FIG. 4 the signal P1SEL 400 is generated as part of the arbitration algorithm, address 317 and data Q 300 are the address input and data output, respectively, from DARAM 113. Referring to Table 3, program read C and program read D would arbitrate for subsystem A 101 DARAM4W 113 in the first half cycle arbitration. The P1 address from program read C and program read D is valid on P1 address bus 314 during the both phases 401 and 402 of the first clock cycle of SLAVE signal 311. The program bus is arbitrated and the winning address is presented to the subsystem A 101 DARAM 113 on address bus 317 when the STRB signal is '0' at time 404. The P1 read data 328 from subsystem A 101 DARAM4W 113 is available during the next full clock cycle at phases 407, 408.

Figure 5:
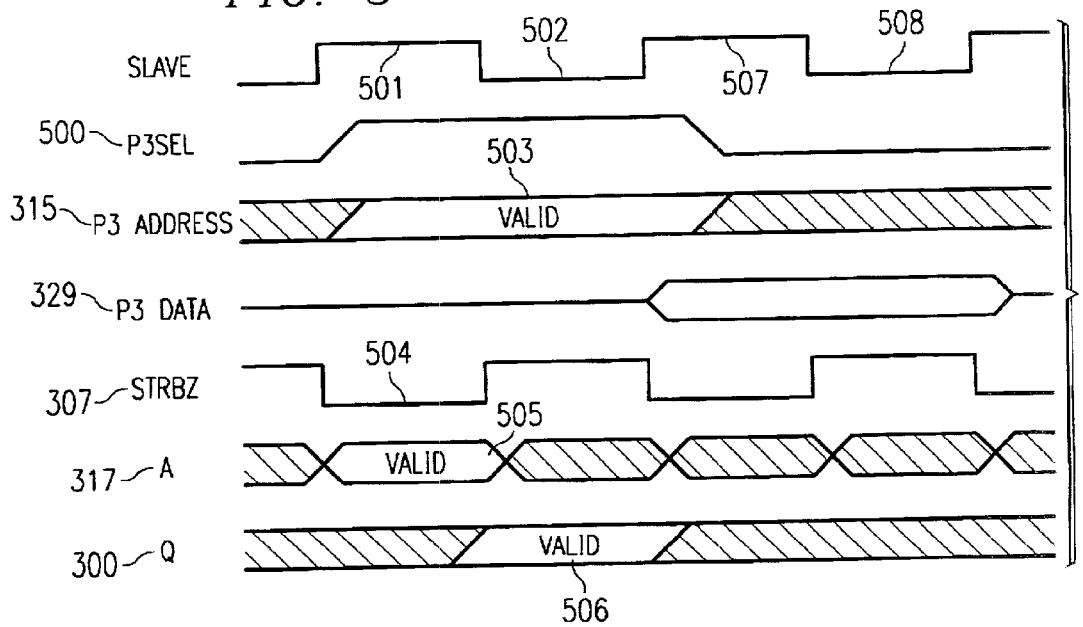
FIG. 5 illustrates the address set-up time for the second half access, only a one-half clock period.

FIG. 5 illustrates the RAM access timing for second-half arbitration that occurs between the two closest subsystems. Subsystem A 101 is once again used as an example. Referring to Table 3, program A and program B arbitrate for memory in the second half arbitration. The address from program A and program B is valid on P3 address bus 315 during the first half-cycle 501, 502 of SLAVE signal 307. The program bus is arbitrated and the winning address is presented to the subsystem A 101 DARAM4W 113 on address bus 317 when the STRBZ signal 307 is "0". Note STRBZ signal 307 is "0" during the first half of SLAVE cycle 501, in contrast to STRB of FIG. 4 which was "0" during the second half of the SLAVE cycle 402. The P3 read data 329 from DARAM4W 113 is available during the next SLAVE cycle 507, 508.

What is claimed is:

1. A multiprocessor system comprising:
   a plurality of data processors, each data processor including:
   a data processing core capable of data processing according to program control and memory access,
   a memory forming a local portion of a unified memory shared among said plurality of data processors, and
   a global memory arbitration logic connected to said data processing core and said memory of each of said data processors, said global memory arbitration logic having a close connection to said data processing core of said corresponding data processor and to said data processing core of at least one other data processor but less than all other data processors and a far connection to said data processing core of additional data processors, said global memory arbitration logic arbitrating access to said memory forming said local portion of said unified memory granting a first type access to said data processing cores having said close connection and a second type access different from said first type access to said data processing cores having said far connection.

2. The multiprocessor system of claim 1, wherein:
   said local portion of said unified memory of each data processor is a dual port memory having a first port and a second port; and
   said global memory arbitration logic arbitrating access to said first port of said dual port memory among said data processing cores having said close connection thereby providing said first type access and arbitrating access to said second port of said dual port memory among said data processing cores having said far connection thereby providing said second type access.

3. The multiprocessor system of claim 2, wherein:
   each of said data processors further includes a local memory connected to said data processing core and directly accessible by said data processing core and neither directly connected to nor directly accessible by said data processing cores of other data processors.

4. A multiprocessor system comprising:
   a plurality of data processors, each data processor including:
   a data processing core capable of data processing according to program control and memory access,
   a memory forming a local portion of a unified memory shared among said plurality of data processors having a first port and a second port, and a global memory arbitration logic connected to said data processing core and said memory of each of said data processors, said global memory arbitration logic having a close connection to said data processing core of said corresponding data processor and to said data processing core of at least one other data processor but less than all other data processors and a far connection to said data processing core of additional data processors, said global memory arbitration logic arbitrating access to said first port of said dual port memory among said data processing cores having said close connection thereby providing a first type access and arbitrating access to said second port of said dual port memory of another data processor among said data processing cores having said far connection to said global memory arbitration logic of said another data processor thereby providing a second type access.

5. The multiprocessor system of claim 4, wherein:

each of said data processors further includes a local memory connected to said data processing core and directly accessible by said data processing core and neither directly connected to nor directly accessible by said data processing cores of other data processors.

6. The multiprocessor system of claim 4, wherein:

said plurality of data processors consists of four data processors;

said global memory arbitration logic of each data processor has a close connection to its corresponding data processor and one other data processor and has a far connection to two other data processors.

* * * * *